United States Patent [19]

Beckmann et al.

[11] 3,906,445

[45] Sept. 16, 1975

[54] ALPHANUMERIC TERMINAL FOR A COMMUNICATIONS SYSTEM

[75] Inventors: Robert M. Beckmann, Hanover Park; James A. Lamb, Hoffman Estates; Donald J. Nieglos, Arlington Heights; Gary R. Reynolds, Streamwood, all of Ill.

[73] Assignee: Motorola, Inc., Chicago, Ill.

[22] Filed: Oct. 21, 1974

[21] Appl. No.: 516,325

[52] U.S. Cl... 340/146.1 BA; 179/15 A; 179/15 AE

[51] Int. Cl.$^2$.... H04L 1/10; H04L 1/08; H04L 1/06

[58] Field of Search .................... 179/15 A, 15 AE; 340/146.1 BA

[56] References Cited

UNITED STATES PATENTS

| | | | |
|---|---|---|---|
| 3,419,804 | 12/1968 | Gorog et al. | 340/146.1 BA |
| 3,427,585 | 2/1969 | Milford | 340/146.1 BA |

*Primary Examiner*—R. Stephen Dildine, Jr.
*Attorney, Agent, or Firm*—James W. Gillman; Eugene A. Parsons

[57] ABSTRACT

An alphanumeric terminal providing a digital message having a fixed portion consisting of the address of the receiver in sixteen bits, followed by a repeat of the address in sixteen bits, a status indication in four bits, a request in four bits and an acknowledge plus an indication of whether text follows in two bits; and a variable portion consisting of a text message of zero to 384 bits, which fixed and variable portions of the message have parity bits inserted after each digital word and are delayed and interleaved (every other bit) with a similar undelayed message to form a composite message, which composite message is preceded by a pseudo random code of 127 bits. The terminal also includes noise and error detection circuitry, associated with the receiver, which separates the two interleaved messages and compares them for similarity, checks the parity bits for correctness and compares the amplitude of each bit to a predetermined upper and lower level to determine whether the bit is noise or a portion of the signal. From the various noise and error checks the terminal then provides a decision as to whether a digital word is good or bad and, if the digital word is in error and comes within the text portion of the message, an asterisk appears in the visual display so that the operator can mentally determine what the character should be.

16 Claims, 6 Drawing Figures

| | | | | | | | |
|---|---|---|---|---|---|---|---|
| PSUEDO RANDOM CODE 127 BITS | 1ST ADDRESS 16 BITS | 2ND ADDRESS 16 BITS | STATUS 4 BITS | REQUEST 4 BITS | ACK 2 BITS | TEXT 0-384 BITS | STOP 6 BITS |

| | | | | | | |
|---|---|---|---|---|---|---|
| 1ST ADDRESS 16 BITS | 2ND ADDRESS 16 BITS | STATUS 4 BITS | REQUEST 4 BITS | ACK 2 BITS | TEXT 0-384 BITS | STOP 6 BITS |

ALPHANUMERIC TERMINAL FOR A COMMUNICATIONS SYSTEM

BACKGROUND OF THE INVENTION

In communications systems and especially in certain applications of the systems, such as police work, taxi cabs, etc., it is desirable to transmit certain predetermined messages as well as to be able to have certain messages displayed visually, in addition to voice messages. Further, in many instances the communications channel is busy and it is desirable for the operator to simply press buttons on a keyboard for a desired message and allow a terminal to automatically send the message when the channel is free. In addition to providing the above features, the present terminal makes several noise and error checks to determine if the information is correct whereas prior art devices generally include noise and errors with very little or no circuitry for determining the correctness of the message.

SUMMARY OF THE INVENTION

The present invention pertains to an alphanumeric terminal in a communications system having a keyboard and a visual display incorporated therein. The terminal provides a first message having a fixed portion including an address of the terminal, a repeat of the address, a status indication, a request and an acknowledgment followed by a variable portion of the message (if desired) which includes text typed into the terminal on the keyboard with parity bits intervening between each six bit binary word of the fixed and variable portion of the message, and a second message, which is a repeat of the first message, interleaved with the first message to form a composite message which is preceded by a pseudo random code. Upon receiving a composite message, the terminal separates and compares the first and second messages, checks the parity bits and checks the amplitude of each bit in both messages against predetermined high and low levels to determine whether the bits are transmitted information or noise. The terminal then determines whether each digital word is good information or in error, if the fixed portion of the message is in error the terminal waits for a retransmission and if the variable portion of the message has an error the terminal places a special character in the visual display to indicate to the operator that an error has occurred.

It is an object of the present invention to provide a new and improved alphanumeric terminal for a communications system.

It is a further object of the present invention to provide an alphanumeric terminal incorporating improved noise and error detecting circuitry.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
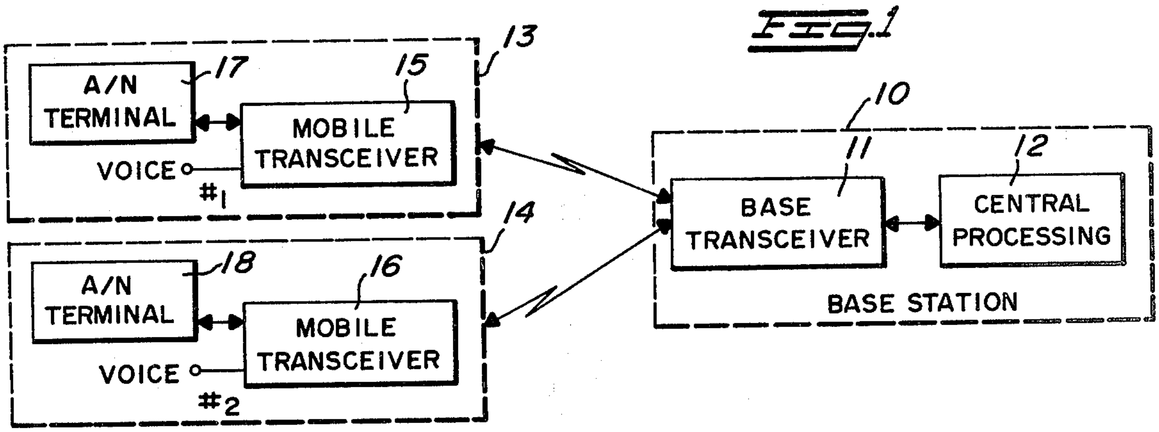
FIG. 1 is a block diagram of a communications system having a plurality of mobile transeivers each including an alphanumeric terminal embodying the present invention.

Referring specifically to FIG. 1 the numeral 10 generally designates a base station including a base transceiver 11 and a central data processing unit 12. A plurality of remote units, which in this embodiment are illustrated as mobile units 13 and 14, each of which includes a mobile transceiver 15 and 16, respectively, and an alphanumeric terminal 17 and 18, respectively. The alphanumeric terminals 17 and 18 are connected to the mobile transceivers 15 and 16 for transmitting data therebetween and the mobile transceivers 15 and 16 are otherwise connected for transmitting voice in the usual manner. It should be understood that any number of mobile units might be coupled to the base station 10 and only two are illustrated for convenience. Further, since each of the mobile units is identical, only the mobile unit 13 will be described in detail in the remaining figures.

Figure 6:
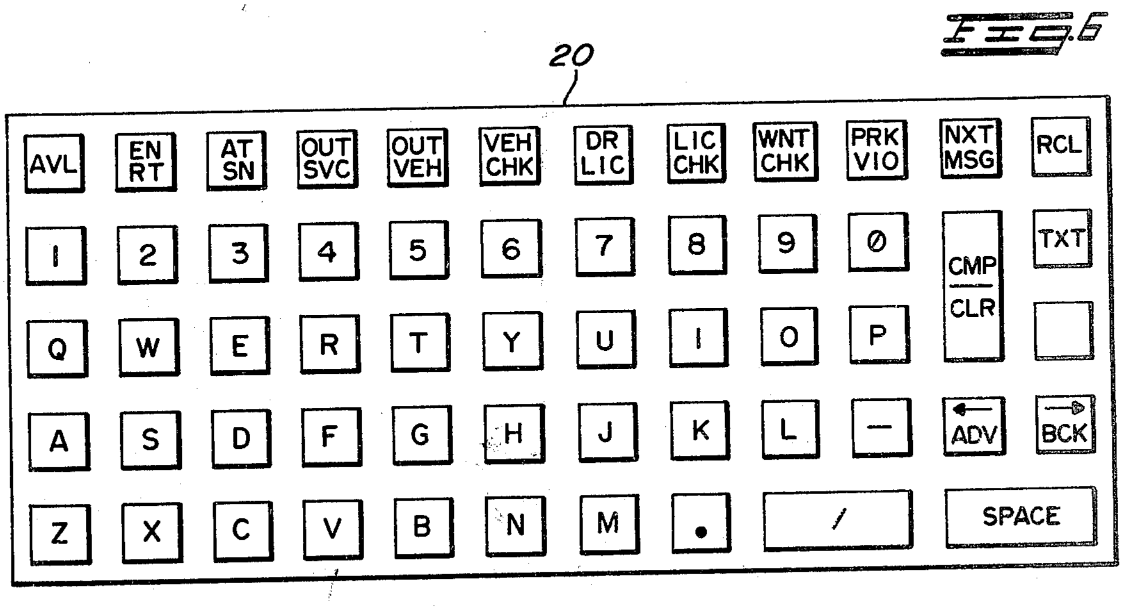
FIG. 6 illustrates an exemplary layout for a keyboard to be used with the terminal illustrated in FIG. 2.
Figures 2, 3:
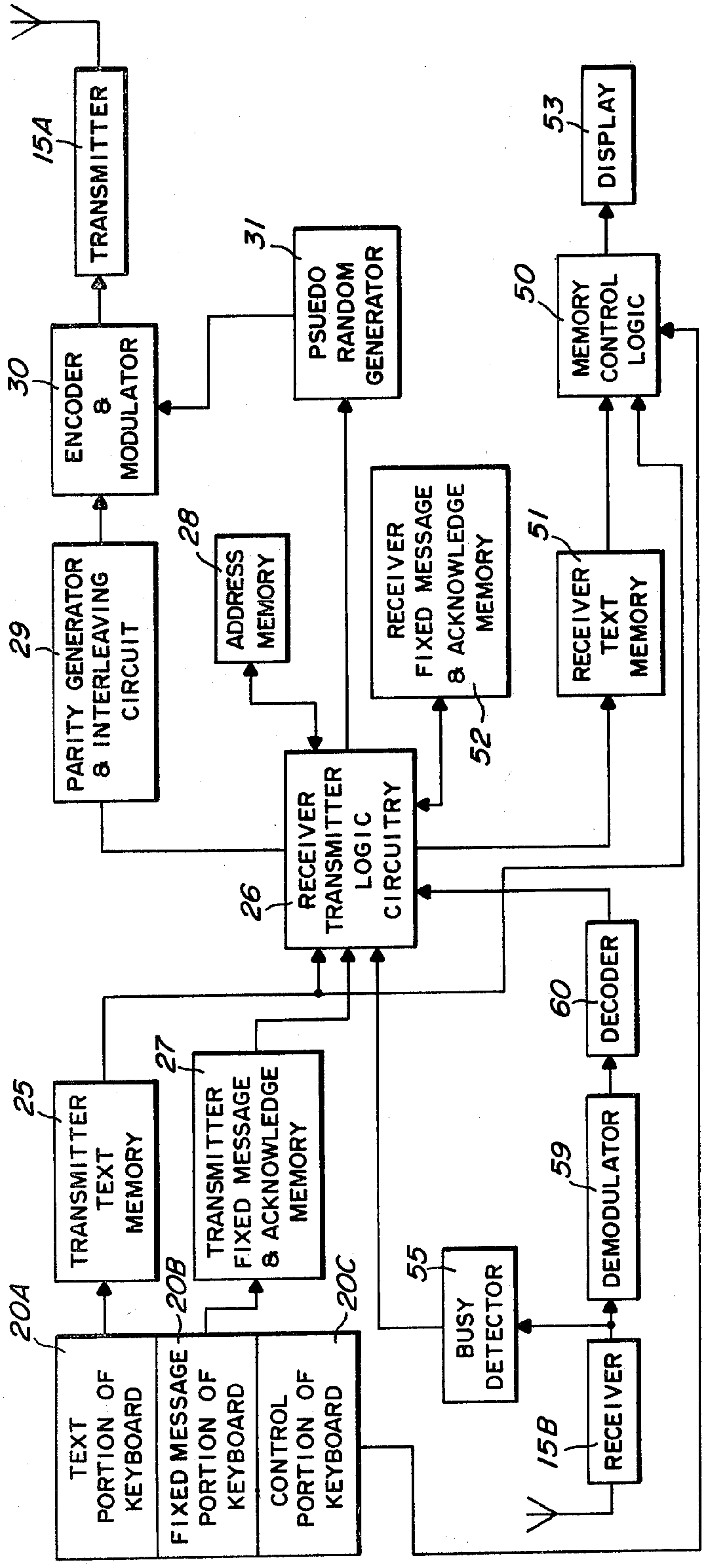
FIG. 2 is a detailed block diagram of a single transeiver with the alphanumeric terminal embodying the present invention.
FIG. 3 illustrates the format of a message transmitted or received by the terminal and transceiver illustrated in FIG. 2.

Referring specifically to FIG. 2, the mobile unit 13 is illustrated in a more detailed block diagram with the mobile transceiver 15 separated into a transmitter 15A and a receiver 15B. The keyboard is generally designated 20 and is separated into three portions: a text portion 20A, a fixed message portion 20B and a control portion 20C. Referring to FIG. 6, the layout of the keyboard 20 is illustrated with the keys zero through one, A through Z, period, dash, slash and space forming the text portion 20A of the keyboard; the keys AVL (available), EN RT (en route), AT SN (at scene), OUT SVC (out of service), OUT VEH (out of vehicle), VEH CHK (vehicle identification check), DR LIC (drivers license check), LIC CHK (license plate check), WNT CHK (wanted person check), and PRK VIO (parking violation check) forming the fixed message portion 20B of the keyboard; and the keys NEXT MSG (next Message), CMP/CLR (compose/clear), RCL (repeat previous message), TXT (text), ADV (shift message display to left) and BCK (shift message display to right) which form the control portion 20C of the keyboard. It should be understood that the 10 fixed message keys are each described in conjunction with a function that may be used when the mobile units are installed in police cars and many other functions or fixed messages may be associated with the keys when the mobile system is utilized for police or other purposes.

The text portion 20A of keyboard 20 is connected to a transmit text memory 25, which is connected to receive/transmit logic circuitry 26. The transmit text memory 25 stores the digital representation for each of the text keys on the keyboard 20 and supplies a digital word to the logic circuitry 26 when a text key is depressed, which digital word is representative of the character on the key depressed. The fixed message portion 20B of keyboard 20 is connected to a fixed message and acknowledge memory 27, which is in turn connected to the logic circuitry 26. The fixed message and acknowledge memory 27 contains digital representations of the 10 fixed messages, which digital representations are conveyed to the logic circuitry 26 when a fixed message key is depressed. Further, after the fixed portion of each message is completed an acknowledge code is supplied by the memory 27 to the logic circuitry 26. An address memory 28 supplies a digital representation of the address of the mobile transceiver 13. The receive/transmit logic circuitry 26 is composed of the gates and clock circuits required to transfer the signals from the various memories and other circuits to the various circuits which utilize the signals at the proper times and in the proper sequences. The logic circuitry 26 is illustrated in a single simplified block for convenience in understanding the system and will not be described in detail since the gating and timing of the various signals can be performed in a variety of ways and by a variety of circuits all of which are well known to those skilled in the art.

The text from the text memory 25, the fixed messages and acknowledge code from the memory 27 and the address from the memory 28 are all connected through the logic circuitry 26 to a parity generator and interleaving circuit 29, the operation of which will be described in detail presently. The output of the circuit 29 is applied to an encoder and modulator 30 along with the output of a pseudo random generator 31, which is controlled by the logic circuitry 26. The pseudo random generator 31 provides a pseudo random signal which precedes the composite signal from the circuit 29 and serves as a leader to accurately indicate the start of the composite message. Pseudo random codes are well known to those skilled in the art and while the present code might be contained in a memory, this is difficult because of the length (127 bits) and, therefore, for convenience the generator 31 is disclosed. More than one pseudo random code may be generated by simple adjustments to the generator 31, with each pseudo random code indicating a different message to follow, for example, a standard pseudo random code may indicate only the alphanumeric terminal 17 will be utilized whereas a special pseudo random code may indicate that a voice message is to follow. This unique method of identifying voice messages with a second pseudo random code allows for rapid and reliable detection of these types of messages for speaker muting purposes.

The encoder and modulator 30 may provide any desired type of encoding and modulating of the message prior to application of the message to the transmitter 15A. In the present embodiment the digital information from the parity generator and interleaving circuit 29 is differentially encoded, i.e., a one in the digital data will provide a change in the encoded data and a zero in the digital data will provide no change in the encoded data, and the encoded data is modulated at some fixed frequency to raise the frequency spectrum of the message a predetermined amount, generally above 300 cycles. Circuitry for encoding and modulating as performed in the disclosed embodiment is disclosed in more detail in a co-pending application entitled, Modulator/-Demodulator For Binary Digitally Encoded Messages, filed Oct. 29, 1974, Ser. No. 518,860 and assigned to the same assignee. The format for the transmitted message is illustrated in FIG. 3.

Figure 4:
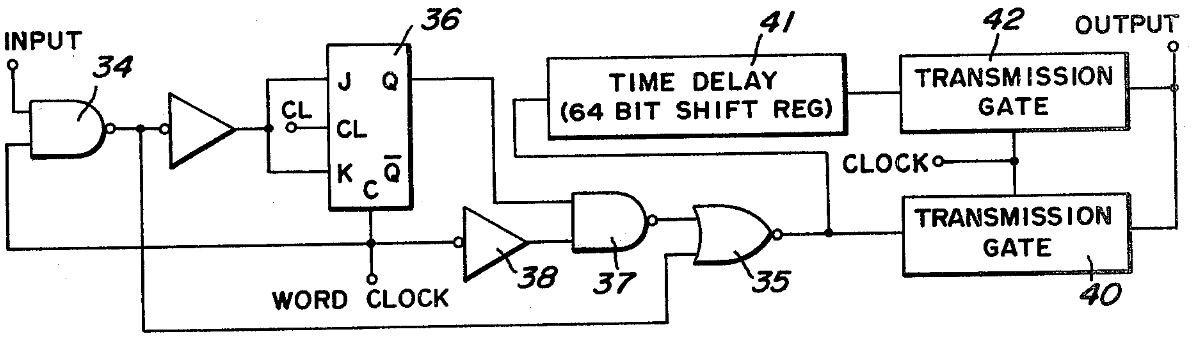
FIG. 4 is a more elaborate block diagram of a portion of the apparatus illustrated in FIG. 2.

Referring to FIGS. 3 and 4, the format of the message applied to the transmitter 15A will be explained in conjunction with the detailed block diagram of the parity generator and interleaving circuit 29. The address memory 28 provides a first address of 16 bits and a repeat of the address through the logic circuitry 26 to the input of the circuit 29 (labeled input in FIG. 4), after which the logic circuitry 26 causes the memory 27 to supply a fixed status message (available, en route, at scene, out of service, or out of vehicle) to the input of the circuit 29. After the status four bits are supplied to the input of the circuit 29, a request message of four bits (vehicle check, drivers license check, license plate check, wanted persons check, or parking violation check) is supplied through the logic circuitry 26 to the input of the circuit 29. After the request message four bits are supplied to the input of the circuit 29, two bits which indicate whether text follows or not are supplied by the logic circuitry 26, after which zero to 384 bits of text may follow from the text memory 25. The first address, second address, status, request and acknowledge (also with text and without text) form a fixed portion of the message which is always the same length, and the text portion of the message is variable.

Referring to FIG. 4, the input terminal of the circuit 29 is connected to one input of a NAND gate 34, the other input of which is connected to receive a word clock pulse. In the present embodiment each digital word contains six bits (ASCII code subset) and the seventh bit remains open when the information is clocked out of the memories by the logic circuit 26, so that a parity bit can be inserted therein. Thus, a word clock pulse is a pulse that appears every seventh bit. In this fashion six bits of information pass through the NAND gate 34 and the seventh bit is blocked. The output of the NAND gate 34 is connected directly to one input of a NOR gate 35 and through an inverter to the J and K inputs of a flip-flop 36. The flip-flop 36 is clocked in the normal fashion and a word clock pulse is applied to the C (clear) input. The non-inverted output of the flip-flop 36 is applied to one input of a NAND gate 37, the other input of which has a word clock pulse supplied thereto through an inverter 38. The output of the NAND gate 37 is connected to the other input of the NOR gate 35.

The rules of operation for the flip-flop 36 are such that when a logical zero is applied to both the J and K inputs and a clock pulse is applied, the output remains the same, but when a one is applied to both of the J and K inputs and a clock pulse is applied the output changes. Thus, the flip-flop 36 will add the number of ones in a digital word (six bits) and the word clock pulse, which goes high every seventh bit, is combined with the output of the flip-flop 36 in the NAND gate 37 to provide a seventh or parity bit which in combination with the previous six bits provides even parity.

The data stream with the parity bits included is applied to the interleaving circuit, which forms a portion of the block 29. The output of the NOR gate 35 is applied directly to a transmission gate 40 and, through a time delay circuit 41, which in this embodiment is a 64 bit shift register, to a second transmission gate 42. The outputs of the transmission gates 40 and 42 are supplied to a single terminal labeled output. Each of the transmission gates 40 and 42 have a clock pulse applied to the control electrode thereof and the gates are constructed such that gate 40 is open when gate 40 is closed and vice versa. Thus, two data streams or messages are produced, the first of which passes directly through the transmission gate 40 to the output terminal and the second of which is delayed 64 bits and then passes through the transmission gate 42 to the output. The data stream is clocked out of the various memories by the logic circuitry 26 so that every other bit is information and the bits in between may simply be repeats of the information bits. Thus, between approximately the thirty-second and thirty-third bit of information which passes through the transmission gate 40, the transmission gate 42 begins to interleave bits of information from the second message, which is identical to the first message but delayed 64 bits (see FIG. 3). By repeating the message twice in this delayed and interleaved format the circuitry for separating the messages can be extremely simple and, if a portion of the message is obscured by noise or fading, a repeat of the obscured portion is available. Prior to encoding and modulating in the circuit 30, the pseudo random generator 31 supplies the pseudo random code which precedes the composite message from the parity generator and interleaving circuit 29.

A memory control logic circuit 50 is utilized to couple signals from the transmit text memory 25, a receive text memory 51 and a receive fixed message and acknowledgment memory 52 to a visual display device 53. The logic circuit 50 is controlled by the control portion 20C of keyboard 20 and allows messages being received to be displayed by connecting memory 51 to the display 53 or allows a message being composed to be displayed by connecting memory 25 to the display 53. Further, the memory control logic 50 controls the memory 25 so that different portions of the message can be observed and corrected by depressing the advance and back-up keys (see FIG. 6). Also, display 53 includes an acknowledge light which is energized when a message is transmitted and is de-energized when the transmission of the message is acknowledged. To acknowledge the transmission of a message the receiving station must send the fixed portion of the message back to the transmitting station with a change in the two acknowledge bits indicating that the message has been received. When the transmitting station receives the same fixed portion of the message it transmitted, including its own address repeated twice, the same status and request codes which were transmitted and the revised acknowledge code (all of which is compared in the logic circuitry 26 and memory 52), the memory control logic 50 supplies a signal to the display 53 which de-energizes the acknowledge light. The logic circuitry 26 is designed so that the transmitter 15A will repeat the last transmission if a proper acknowledge signal is not received. The logic circuitry 26 will cause the transmitter 15A to retransmit the signal seven times and, if a proper acknowledge signal is not received during these seven transmissions, the memory control logic 50 will cause the acknowledge light in the display 53 to begin flashing, which is an indication to the operator that the transmission was not completed and he must reinitiate the transmission. The operation of the retransmissions is accomplished through an electronic timer and counter in the logic circuitry 26, which times out if a proper acknowledge message is not received within a predetermined period of time and causes the retransmission.

In a typical transmission the operator will be requesting information, in which case he will enter the message into the text memory 25 by typing the message on the keyboard 20. The message will also appear on the display 53. Once the message is entered into the memory 25, the operator initiates transmission by depressing the proper request key, which causes the fixed and variable messages from the memories 28, 27 and 25 to be applied to the logic circuitry 26 and to be transmitted as previously described. At the end of the text message a special character is supplied to the logic circuitry 26 which causes the logic circuitry 26 to generate a transmit stop code of six bits. In the present embodiment this transmit stop code is six zeros, but it should be understood that any stop code desired might be utilized. Each time a message is sent the status last entered into the memory 27 will be transmitted. If a change of status occurs, by depressing a different one of the five status buttons, a transmission is automatically initiated with no text or request. When no text is included in a transmission the two acknowledge bits are zero zero in the present embodiment. Thus, when a change of status message is sent the four request bits and two acknowledge bits are all zero, which appears as a transmit stop code to the system. Whenever a message is initiated, the channel must be clear before the transmitter 15A can be energized. A busy detector 55, which is connected to monitor the output of the receiver 15B, is connected to the logic circuitry 26 and prevents energization of the transmitter 15A until the channel is clear.

The output of the receiver 15B is coupled to a demodulator circuit 59, which places the received messages in the proper digital form by removing any modulation and encoding other than the digital coding. The stream of digital data from the demodulator 59 is applied to a decoder circuit 60, the output of which is applied to the logic circuitry 26. The decoder circuit 60 is illustrated in detail in FIG. 5.

Figure 5:
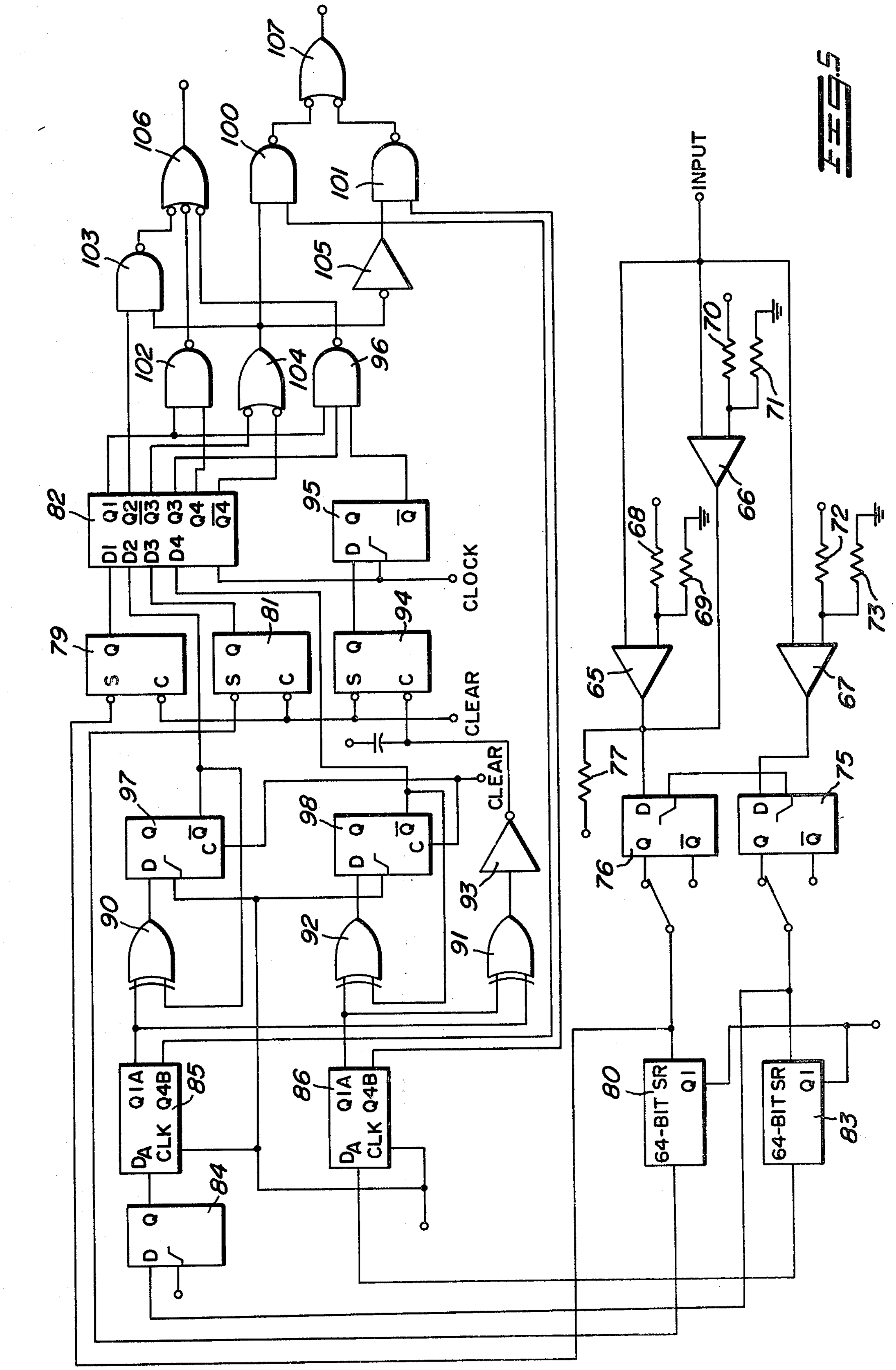
FIG. 5 is a more elaborate block diagram of another portion of the apparatus illustrated in FIG. 2.

Referring specifically to FIG. 5, the digital data stream from the demodulator 59 is applied to a terminal labeled input, which is connected to the negative input terminal of a comparator 65 and the positive input terminals of a comparator 66 and a comparator 67. The positive terminal of the comparator 65 is connected to a voltage divider circuit, formed by a pair of resistors 68 and 69 connected in series between a positive voltage source and a reference potential (such as ground). The voltage divider circuit supplies a predetermined reference voltage to the positive input of the comparator 65 so that an output is produced by the comparator 65 only when the input data exceeds the predetermined reference voltage. In a similar fashion a pair of resistors 70 and 71 form a voltage divider which provides a predetermined reference voltage to the negative input of the comparator 66 and a pair of resistors 72 and 73 form a voltage divider which provides a predetermined reference voltage to the negative input of the comparator 67. The predetermined reference voltage applied to the negative input of the comparator 67 determines whether the incoming data is a one or a zero by providing a high or one signal at the output when the input signal exceeds the predetermined reference voltage and providing a low or zero signal at the output when the input data signal is lower than the predetermined reference voltage. The output from the comparator 67 is essentially asynchronous data and is applied to the D input of a clocked flip-flop 75 which provides a synchronized stream of digital data at the output thereof.

The outputs of the comparators 65 and 66 are connected together to the D input of a second clocked flip-flop 76 as well as through a resistor 77 to a positive voltage source. The predetermined reference voltage applied to the positive input of the comparator 65 is somewhat lower than the predetermined reference voltage applied to the negative input of the comparator 67, and the predetermined reference voltage applied to the negative input of the comparator 66 is somewhat higher than the reference voltage applied to the negative input of the comparator 67. Thus, the comparators 65 and 66 define an upper and lower limit for the input data which, if exceeded by the input data (i.e., data having an amplitude greater than the reference voltage on the positive terminal of the comparator 65 or less than the reference voltage on the negative terminal of the comparator 66) indicates a good signal whereby a low or zero signal is applied to the flip-flop 76 and if not exceeded (i.e., the amplitude of the input data lies between the reference voltage on the positive terminal of the comparator 65 and the reference voltage on the negative terminal of the comparator 66) indicates noise and a high or one signal is applied to the input of the flip-flop 76. In this manner each bit of the digital stream applied to the input terminal is analyzed to determine whether it is a digital bit or whether it may be noise.

The noise indicating signals are synchronized by the flip-flop 76 and applied directly to one input of a latch circuit 79 and through a delay circuit, which in the present embodiment is a 64 bit shift register 80, to the input of a second latch circuit 81. Each of the latch circuits 79 and 81 have an input for resetting or clearing the latches, which is connected to a terminal designated clear. A clear signal is applied to the terminal at approximately the end of each digital word and this signal resets the latch circuits 79 and 81 in preparation for the next digital word. The 64 bit shift register 80 provides one delayed digital stream so that the first and second digital messages produced by the interleaving circuit 29 (see FIG. 2) will be matched to the proper noise indication. Whenever the noise indication stream or the delayed noise indication stream contains a one or high level signal the latch circuit 79 or 81, respectively, latches and provides a one at the output thereof until a clear signal is applied thereto. The signals from the latch circuits 79 and 81 are applied to two inputs D1 and D3 of a holding circuit 82.

The synchronized data stream from the flip-flop 75 is applied to a delay circuit, which in this embodiment is a 64 bit shift register 83 and to a one bit delay, which in this embodiment is a flip-flop 84. The combination of the 64 bit shift register 83 and the flip-flop 84 provides two data streams wherein the information is no longer delayed relative to each other. The data stream from the flip-flop 84 is applied to an input of an eight bit shift register 85 and the data stream from the 64 bit shift register 83 is applied to an input of an eight bit shift register 86. The shift register 85 has an output, Q1, which is delayed one bit and which is applied to one input of an exclusive OR circuit 90 and one input of a second exclusive OR circuit 91. The shift register 86 has an output, Q1, which is delayed one bit and which is applied to one input of an exclusive OR circuit 92 and to a second input of the exclusive OR circuit 91. The exclusive OR circuit 91 is a mismatch detector which compares the bits in the first and second messages to determine if they are the same. When a difference occurs the exclusive OR circuit 91 provides an output which is inverted by an inverter 93 and applied to the clear terminal of a latch circuit 94. The input terminal of the latch circuit 94 is connected to the terminal designated clear which receives a signal at the end of each digital word, as explained above. Thus, at the end of each digital word (or prior to the next digital word) a clear pulse causes the latch circuit 94 to latch so that the output thereof is high. If a mismatch between the two digital streams occurs the exclusive OR circuit 91 produces a high or one signal at the output which is inverted by the inverter 93 and applied to the clear terminal of the latch circuit 94 to clear the latch circuit 94 and produce a low at the output thereof. The low at the output of the latch circuit 94 is applied to a flip-flop circuit 95, the inverted output of which is connected to one input of a NAND gate 96. Thus, whenever a mismatch occurs between the first and second messages a one is applied to an input of the NAND gate 96.

The output of the exclusive OR gate 90 is applied to the input of the flip-flop 97, the inverted output of which is connected to a second input of the exclusive OR gate 90 to form a parity checker for the first message. The output of the exclusive OR gate 92 is connected to the input of a flip-flop 98 the inverted output of which is connected to a second input of the exclusive OR gate 92 to form a parity checker for the second message. The parity checkers 90-97 and 92-98 operate to provide a low signal at the inverted outputs of the flip-flops 97 and 98 if the parity of each word is even (all of the ones in the word plus the parity bit add up to an even number). If a parity error occurs in a word in either the first or second message the inverted output of the flip-flop 97 or 98, respectively, goes high and this high signal is applied to D2 and D4, respectively, of the holding circuit 82. A clear pulse is applied to each of flip-flops 97 and 98 at the end of each word. The signals applied to the inputs D1 through D4 of holding circuit 82 are clocked into the holding circuit 82 by a clock pulse applied to a terminal designated "clock." Since any noise or parity error appearing at an input of the holding circuit 82 must be clocked into the holding circuit 82 before the signal is removed, the clock pulse must be applied to the clock terminal of the holding circuit 82 before clear pulses are applied to the latch circuits 79, 81 and 94 and the flip-flops 97 and 98. These are all applied, however, at approximately the end of a digital word. Once the signals are clocked into the holding circuit 82 the latch circuits and parity checkers can be cleared for the next word.

The first and second messages or data streams, which are delayed eight bits by the shift registers 85 and 86, respectively, are applied to inputs of a first NAND gate 100 and a second NAND gate 101. The noise and parity error signals applied to the inputs D1 through D4 of holding circuit 82 are held for a sufficient period of time to coincide with the ends of the words applied to the NAND gates 100 and 101 (approximately seven bits). The holding circuit 82 has an output Q1, which coincides with the input D1, connected to an input of a NAND gate 102 and an input of the NAND gate 96.

The holding circuit 82 has an output Q2, coinciding with the input D2, connected to an input of a NAND gate 103. An non-inverted output Q3 and an inverted output Q3 of the holding circuit 82, which coincide with the input D3, are connected to an input of the NAND gate 96 and an input of a NAND gate 104, respectively. A non-inverted output Q4 and an inverted output Q4 of the holding circuit 82, coinciding with the input D4, are connected to an input of the NAND gate 102 and an input of the NAND gate 104. The output of the NAND gate 104 is connected to an input of the NAND gate 103, an input of the NAND gate 100 and, through an inverter 105 to an input of the NAND gate 101. A NAND gate 106 has three inputs connected to an output of the NAND gate 103, an output of the NAND gate 102, and an output of the NAND gate 96, respectively. A NAND gate 107 has two inputs connected to the outputs of NAND gate 100 and NAND gate 101, respectively. NAND gates 100, 101 and 107 form a data stream selector which decides which data stream is the most likely to be correct and connects this data stream to the logic circuitry 26. The NAND gates 96, 104, 102, 103 and 106 provide a flag to the logic circuitry which places a predetermined character, in this embodiment an asterisk, in the receive text memory 51 in place of the word which is in error.

It can be seen from a review of the connections of the NAND gates 96, 102, 103, 104 and 106 that the following conditions will produce a flag. Noise in the first and second message and a mismatch of the first and second message cause the NAND gate 96 to supply an output to the NAND gate 106 which produces a flag. Noise in the first message and a parity error in the second message causes the NAND gate 102 to supply a signal to the NAND gate 106 which produces a flag. Noise and/or a parity error in the second message causes the NAND gate 104 to supply a signal to the NAND gate 103 which, if a parity error is present in the first message, supplies a signal to the NAND gate 106 to produce a flag.

The data stream selector also utilizes the output from the NAND gate 104 to determine which data stream to select. With no errors in the noise or parity of the second message, the NAND gate 104 supplies a zero to the input of the NAND gate 100 and a one, through the inverter 105, to the input of the NAND gate 101. With a zero on one input of the NAND gate 100, the output thereof will always be one which means that the NAND gate 107 will operate as an inverter for any signals applied to the other input. Also, with a one applied to the input of the NAND gate 101 from the inverter 105, the NAND gate 101 will act as an inverter for any signal applied to the other input. Thus, the data stream from the 8 bit shift register 86 passes directly through the NAND gates 101 and 107 with two inversions so that it appears the same at the output as it did at the input. The data stream from the eight bit shift register 86 is the second message and, if a parity error or noise signal appears therein the output of the NAND gate 104 will shift causing the NAND gate 101 to stop the second message from passing therethrough and opening the NAND gate 100 to the first message from the eight bit shift register 85. While the first message may also have an error or noise therein, if such an error exists a flag will be produced which will cause an asterisk to appear in place of the character represented by the digital word. Thus, good data should always be conveyed through the logic circuitry 26 to the receive text memory 51 and, if good data is not available an asterisk will be displayed on the display 53 so that the operator can make a decision.

Thus, an alphanumeric terminal for a communications system has been disclosed which has superior error correcting capabilities and which has a variety of improved message handling features. While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. In a communications system utilizing digitally encoded messages and including a transmitter and receiver, a terminal with the capability of sending predetermined messages comprising:

a. keyboard means providing text signals representative of alphanumeric characters and control signals in response to operation of keys thereon;
b. a text memory connected to receive and store the text signals from said keyboard means;
c. a fixed message memory having therein predetermined messages and connected to receive control signals from said keyboard means for selecting predetermined messages therein in response to operation of control keys on said keyboard means;
d. an address memory having therein an address code of said transmitter and receiver;
e. logic circuitry connected to receive the text signals from said text memory, the selected predetermined messages from said fixed message memory and the address code from said address memory and providing a first digital message serially including the text signals, the selected predetermined messages and the address code;
f. a parity generator and interleaving circuit connected to receive the first digital message from said logic circuitry and periodically generate and insert parity bits therein, said parity generator and interleaving circuit developing a second digital message serially including the text signals, the selected predetermined messages, the address code and the parity bits and interleaving the first and second digital messages into a composite message; and
g. means connecting the composite message to said transmitter.

2. A communications system as claimed in claim 1 including a psuedo random code generator connected to the connecting means and providing a pseudo random code serially preceding the composite message.

3. A communications system as claimed in claim 2 wherein the pseudo random code generator includes circuitry for providing several pseudo random codes each of which is an indication of the type of message to follow.

4. A communications system as claimed in claim 1 wherein the connecting means includes an encoder and modulator for differentially encoding the composite signal and modulating the differentially encoded signal at a predetermined frequency.

5. A communications system as claimed in claim 1 wherein the parity generator and interleaving circuit includes delay means for delaying the second digital message for a short period relative to the first digital message prior to interleaving the two messages.

6. A communications system as claimed in claim 1 wherein the logic circuitry includes means for inserting the address code twice in each of the first and second digital messages.

7. A communications system as claimed in claim 6 wherein the logic circuit and the parity generator and interleaving circuit are connected to provide each of the first and second digital messages in the following form, the address code, followed by a repeat of the address code, followed by at least one predetermined message, followed by any signals stored in the data memory, and followed by a stop indicating signal.

8. A communications system as claimed in claim 7 wherein the fixed message memory includes an acknowledge memory and an acknowledge code is serially included in the first digital message by said logic circuitry.

9. A communications system as claimed in claim 8 wherein the parity generator and interleaving circuit, the acknowledge memory, the address memory and the fixed message memory are all constructed so that the first and second digital messages each are serially composed of a first portion having a fixed length including a 16 bit address, a repeated 16 bit address, a first four bit predetermined message, a second four bit predetermined message and a two bit acknowledgment code and a second text portion variable in length with both the fixed and variable portions having a parity bit inserted after every sixth information bit.

10. A communications system as claimed in claim 9 wherein the pseudo random generator is constructed to provide approximately 127 bits serially preceding the first address.

11. A communications system utilizing digitally encoded messages comprising:

a. a base station including a transmitter, a receiver and means for processing messages; and b. a plurality of mobile stations each including a transmitter and receiver and a terminal including keyboard means providing text signals representative of alphanumeric characters and control signals in response to operation of keys thereon, a text memory connected to receive and store the text signals from said keyboard means, a fixed message memory having therein predetermined messages and connected to receive control signals from said keyboard means for selecting predetermined messages therein in response to operation of control keys on said keyboard means, an address memory having therein an address code of said mobile transmitter and receiver, logic circuitry connected to receive the text signals from said text memory, the selected predetermined messages from said fixed message memory and the address code from said address memory and providing a first digital message serially including the text signals, the selected predetermined messages and the address code, a parity generator and interleaving circuit connected to receive the first digital message from said logic circuitry and periodically generate and insert parity bits therein, said parity generator and interleaving circuit developing a second digital message serially including the text signals, the selected predetermined messages, the address code and the parity bits and interleaving the first and second digital messages into a composite message, means connecting the composite message to said transmitter of the associated mobile station, signal processing circuitry connected to said associated mobile receiver and said logic circuitry for converting received signals including interleaved first and second messages into a usable message, comparing means connected to said logic circuitry and said address memory for identifying messages received by said associated mobile receiver which contain the address code thereof, and display means connected to said logic circuitry for displaying text messages supplied to said text memory and for displaying messages identified by said comparing means.

12. A communications system utilizing digitally encoded messages as claimed in claim 11 wherein the signal processing circuitry includes parity checking means supplying an output signal indicative of an error in the portion of the received signal associated with each of the parity bits checked and gating means connected to receive the output signal and connect the portions of one of the first and second messages in the received signal which do not contain errors to said logic circuitry.

13. A communications system utilizing digitally encoded messages as claimed in claim 11 wherein the signal processing circuit includes noise indication means for comparing the amplitude of each bit in the received signal to predetermined high and low levels and providing output signals indicating bits not exceeding said levels, and gating means connected to receive the output signals and connect the bits of one of the first and second messages in the received signal which exceed said levels to said logic circuitry.

14. A communications system utilizing digitally encoded messages as claimed in claim 13 wherein the signal processing circuit includes means for separating the first and second messages in the received signal and means for matching each word in the first message to the words in the second message representing the same portion of the message, said matching means providing an output signal indicative of matches, the output signal of said matching means being supplied to said gating means and operating said gating means to connect the words of one of the first and second messages in the received signal to said logic circuitry when a match is indicated.

15. In a communication system including a receiver for receiving a signal composed of a first digital message interleaved with a second digital message, which is the first digital message repeated, and periodic parity bits, signal processing circuitry comprising:

a. parity checking means having applied thereto the received signal and providing an output signal indicative of an error in the portion of the received signal associated with each of the parity bits checked;

b. noise indication means having applied thereto the received signal for comparing the amplitude of each bit in the received signal to predetermined high and low levels and providing output signals indicating bits not exceeding said levels;

c. separating means having applied thereto the received signal and separating the first and second messages therein;

d. matching means connected to said separating means and matching each word in the first message to each word in the second message, said matching means providing an output signal indicative of matching words; and e. gating means connected to receive the output signals from said parity checking means, said noise indication means and said matching means, said gating means including circuitry for passing digital words in one of said first and second messages which do not have parity errors and which contain bits that exceed the high and low levels of the noise indication means, said gating means further including circuitry for passing digital words in one of said first and second messages which do not have parity errors, which contain bits that do not exceed the high and low levels of the noise indication means and which match, and said gating means further including circuitry providing a flag signal when the same digital word in both the first and second messages contains one of a parity error, a parity error and bits which do not exceed the levels in the noise indication means, and a mismatch and bits which do not exceed the levels in the noise indication means.

16. In a communications system a receiver for receiving a signal composed of a first digital message interleaved with a second digital message, which is the first digital message repeated, and parity bits, signal processing circuitry as claimed in claim 15 including in addition display means connected to receive the digital words passed by said gating means and providing a visual display of characters representative of the digital words, said display means providing a visual display of a special character in response to a flag signal from said gating means.

* * * * *